United States Patent [19]

Yoshii et al.

[11] 4,411,609

[45] Oct. 25, 1983

[54] APPARATUS FOR MOLDING PLASTIC

[75] Inventors: Masaki Yoshii; Hidemi Sato; Aizo Kaneda, all of Yokohama; Masayoshi Aoki, Kamakura; Hitoshi Yokono, Yokohama; Mitsunori Oka, Hadano, all of Japan

[73] Assignee: Hitachi, Ltd., Tokyo, Japan

[21] Appl. No.: 255,102

[22] Filed: Apr. 17, 1981

[30] Foreign Application Priority Data

Apr. 18, 1980 [JP] Japan .................... 55-50406

[51] Int. Cl.³ .............................................. B29C 1/06
[52] U.S. Cl. ...................................... 425/149; 425/543
[58] Field of Search ................ 264/40.1; 425/149, 543

[56] References Cited

U.S. PATENT DOCUMENTS

3,920,367 11/1975 Ma ........................................ 425/149
4,208,176 6/1980 Salerno ........................... 425/149 X Primary Examiner—Thomas P. Pavelko
Attorney, Agent, or Firm—Antonelli, Terry & Wands

[57] ABSTRACT

A method of and an apparatus for molding a plastic wherein the injection pressure (transfer pressure) is switched to a holding pressure when the internal pressure of the mold cavity sensed by a pressure sensor reaches a predetermined injection pressure (transfer pressure), to initiate holding of the pressure applied to the cavity. The holding pressure is removed when the internal pressure thereof becomes zero or in accordance with the detection of a predetermined inflection point in the internal pressure which is indicative of a gate sealing point in the mold cavity or is brought to a predetermined value close to zero. The molded articles are of high precision finishes, and conservation of energy and natural resources can be achieved.

10 Claims, 11 Drawing Figures

APPARATUS FOR MOLDING PLASTIC

FIELD OF THE INVENTION

This invention relates to a method of and an apparatus for molding a plastic.

BRIEF DESCRIPTION OF THE DRAWINGS

FIG. 2b is a diagrammatic representation of the relation between the cavity internal pressure and the time obtained under the conditions of injection molding shown in FIG. 2a;

FIG. 3b is a diagrammatic representation of the relation between the cavity internal pressure and the time obtained under the conditions of injection molding shown in FIG. 3a;

FIG. 4b is a diagrammatic representation of the relation between the cavity internal pressure and the time obtained when molding is carried out as shown in FIG. 4a;

DESCRIPTION OF THE PRIOR ART

Figure 1:
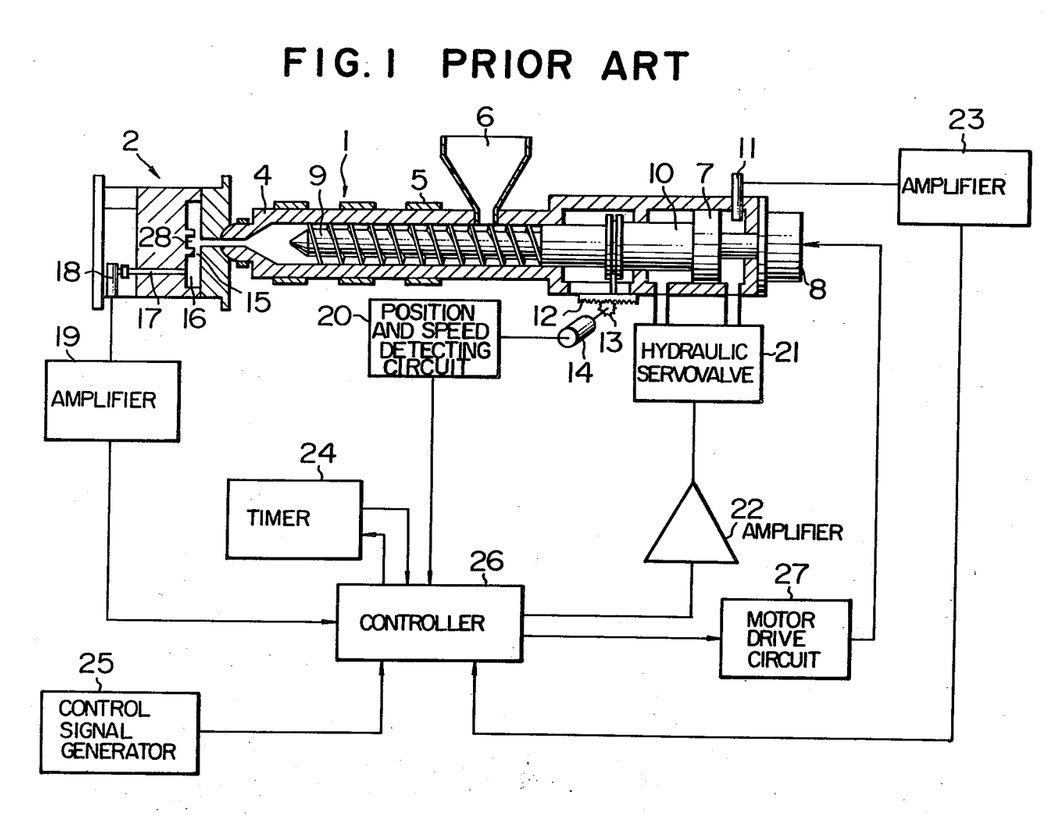
FIG. 1 is a view showing an injection molding apparatus of the prior art.

FIG. 1 shows the arrangement of an injection molding apparatus showing one example of the plastic molding apparatus of the prior art. The injection molding apparatus comprises an injection unit 1 including an injection cylinder 4 having a heater 5, a hopper 6, a hydraulic cylinder 7 and a screw 9 rotated by a motor 8 and moved by a piston 10 of the injection cylinder 4. A hydraulic pressure sensor 11 is inserted in the hydraulic cylinder 7 for sensing the injection pressure and the back pressure of the injection cylinder 4, and a pinion 13 connected to a detector 14, such as a rotary potentiometer, for measuring the position and speed of the screw 9 is in meshing engagement with a rack 12 secured to the piston 10. A mold 2 of the injection molding apparatus is equipped with a pressure sensing pin 17 for sensing the pressure of resinous material injected into a cavity 16 through a gate 15 or the internal pressure of the cavity 16, and a pressure sensor 18 in engagement with the pressure sensing pin 17 for sensing the cavity internal pressure. An amplifier 19 is connected to the sensor 18 for amplifying the signal produced thereby. A position and speed detecting circuit 20 is connected to the detector 14 for amplifying the signal detected thereby and obtaining the position and the speed of movement of the screw 9. A hydraulic servovalve 21 for controlling the hydraulic cylinder 7 is connected to a servoamplifier 22. An amplifier 23 is connected to the hydraulic pressure sensor 11 for amplifying the signal produced thereby. A timer 24 for setting the pressure holding times and a sequence control signal generator 25 for effecting sequence control of the injecting molding apparatus are connected to a controller 26 for effecting control of the injection molding apparatus.

In operation, the controller 26 actuates the motor 8 through a motor drive circuit 27, to rotate the screw 9. The resinous material contained in the hopper 6 is fed to a forward end portion of the injection cylinder 4 and melted by the heater 5. At this time, the controller 26 issues instructions through the amplifier 22 to the hydraulic servovalve 21 so as to bring the pressure sensed by the hydraulic pressure sensor 11 to a predetermined back pressure level. Thereafter, as the mold 2 is brought to a condition ready for injection, the controller 26 issues instructions to the motor drive circuit 27 to interrupt the rotation of the motor 8 and actuate the hydraulic cylinder 7, so that the screw 9 moves to initiate injection. The controller 26 controls the hydraulic servovalve 21 through the amplifier 22 to bring the speed of the screw 9 detected by the position and speed detecting circuit 20 to a predetermined value. When the pressure in the cavity 16 of the mold 2 sensed by the pressure sensor 18 reaches a predetermined injection pressure level, the controller 26 controls the hydraulic servovalve 21 in such a manner that the hydraulic pressure sensed by the hydraulic pressure sensor 11 is brought to a predetermined holding pressure level. That is, as a charge of the resinous material is fed to the cavity 16 of the mold 2 and the internal pressure of the cavity 16 reaches the predetermined level, the pressure in the injection cylinder 4 is switched to the holding pressure. At this time, the timer 24 is actuated and counts the time at which it is set. After lapse of the pressure holding time at which the timer 24 is set, the timer 24 supplies a signal to the controller 26 which actuates the hydraulic servovalve 21 through the amplifier 22, to reduce the hydraulic pressure applied to the hydraulic cylinder 7 to zero. Thereafter the screw 9 moves rearwardly, thereby completing one cycle of operation.

Heretofore, it has been usual practice for one of ordinary skill in the art to set the timer 24 at an arbitrarily selected holding time which is considered suitable for the particular resinous material to be injection molded by empirically taking into consideration various conditions including the temperature of the mold, temperature of the resinous material, injection pressure, holding pressure, etc., as well as the shape of the gate and a large margin of safety. This practice has tended to bring about a situation in which a holding pressure of a higher level than is necessary is applied to the resinous material in the cavity 16 of the mold 2, thereby causing a loss of energy and a shortening of the service life of the molding apparatus.

If the pressure holding time at which the timer 24 is set were shortened to obviate these disadvantages, the resinous material charged in the cavity 16 might flow rearwardly from the gate 15 to a runner 28 and cause a shrinkage to occur in the molded plastic article or reduce the dimensions thereof, thereby rendering the molded plastic article unacceptable for specifications and orders which require molded plastic articles of high precision finishes.

SUMMARY OF THE INVENTION

This invention has been developed for the purpose of obviating the aforesaid disadvantages of the prior art. Accordingly the invention has as its object the provision of a method of and an apparatus for molding a plastic capable of automatically controlling the pressure holding time to an optimum level in molding the plastic, so that the molding apparatus can have a prolonged service life by avoiding the loss of more energy and material than are necessary and a molded plastic article of high precision finishes can be produced by avoiding the back flow of the charge of resinous material in the cavity of the mold from the gate to the runner.

In view of the fact that it is no use to apply a holding pressure to the mold through the injection cylinder or plunger after the gate is sealed and the fact that removal of the holding pressure prior to sealing of the gate prevents molded plastic articles of high precision finishes from being produced due to the occurrence of a shrinkage in the molded plastic article or a reduction in their dimensions, attempts have been made to detect the gate sealing point based on the internal pressure of the cavity of the mold sensed by a pressure sensor. In recent years, molded plastic articles having a small cross-sectional area of 2 to 0.2 mm$^2$ in the gate have come to account for about 70% of all the molded plastic articles being produced, so as to facilitate removal of the molded articles of thermoplastic resinous material from the mold by breaking the gate and the runner and to avoid the gate stub marring the external view of the articles. The internal pressure of the cavity for molding such articles has a characteristic such that it gradually decreases from the time pressure holding is initiated until the time the resinous material completely sets in the cavity, thereby making it difficult to electrically determine the suitable gate sealing point.

Accordingly, the outstanding characteristic of the invention is that the holding pressure is removed when the internal pressure of the cavity as sensed by the pressure sensor reaches zero or a value (threshold value) close to zero, to enable injection molding of a plastic to be effected with an optimum pressure holding time without requiring to run or shot a trial molding even if there are changes in the resinous material, molding conditions (temperature of mold, temperature of resinous material, injection pressure, holding pressure) and gate configuration. Thus the invention is capable of producing molded plastic articles of high precision finishes while conserving raw material and energy.

DESCRIPTION OF THE PREFERRED EMBODIMENTS

Figure 2A:
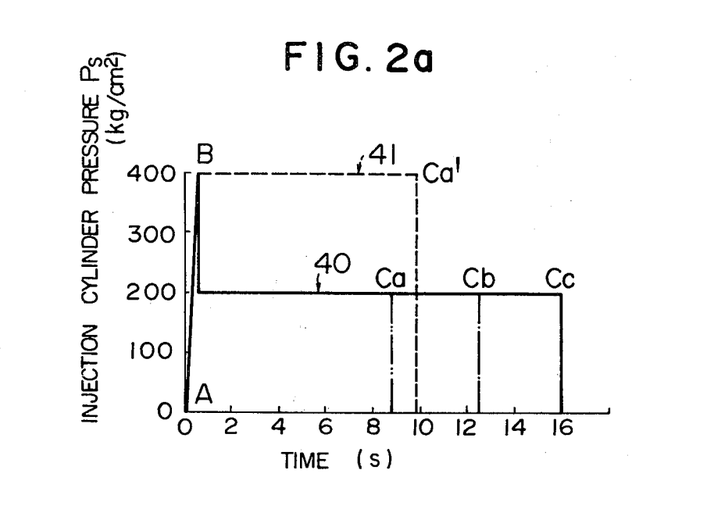
FIG. 2a is a diagrammatic representation of the relation between the injection cylinder pressure and the time obtained when injection molding of thermoplastic resinous material is carried out under certain conditions according to the invention.
Figure 2B:
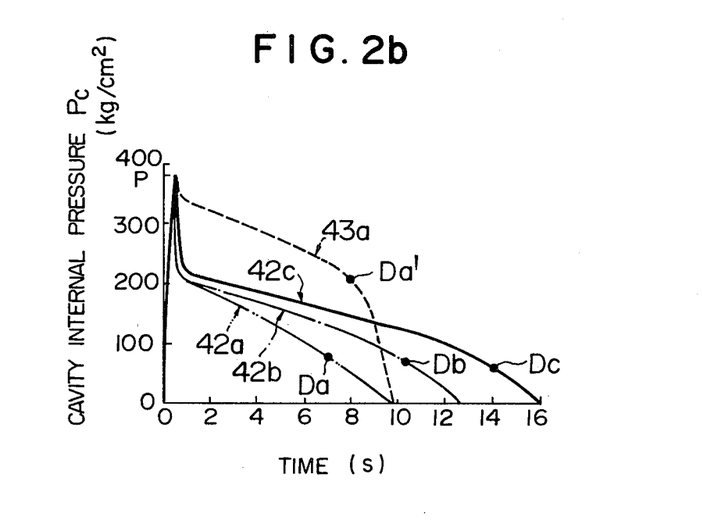

FIG. 2a shows the relation between the injection cylinder pressure (kg/cm$^2$) and the time (S) obtained when injection molding of polyacetal resin was carried out according to the invention, and FIG. 2b shows the relation between the cavity internal pressure (kg/cm$^2$) and the time (S) obtained when injection molding was carried out under the same conditions as the injection molding described by referring to FIG. 2a. The conditions common to FIGS. 2a and 2b are that the single gate 15 having a cross section of 1×1.5 mm is located at one end face of a cylinder part, that the cavity 16 is cylindrical in shape and has an inner diameter of 14 mm, an outer diameter of 20 mm and a length of 14 mm, and that the temperature of the resinous material is 212° C. The abscissa in the diagrams shown in FIGS. 2a and 2b represents the time elapsing after injection is initiated. Lines 40 and 41 represent injection cylinder pressures applied by the hydraulic cylinder 7, and curves 42a, 42b and 42c indicate the characteristics of the cavity internal pressure obtained when the injection cylinder pressure represented by 40 is applied (injection pressure, 400 kg/cm$^2$; and holding pressure, 200 kg/cm$^2$) with the mold temperatures of 60° C. (42a), 80° C. (42b) and 100° C. (42c). A curve 43a indicates the characteristic of the cavity internal pressure obtained when the injection cylinder pressure represented by 41 is applied (injection pressure, 400 kg/cm$^2$; and holding pressure, 400 kg/cm$^2$) with the mold temperature of 60° C. A section A-B represents an injection step, and sections B-Ca, B-Cb, B-Cc and B-Ca' each represent a pressure holding step. Points Da, Db, Dc and Da' each represent a point in time at which solidification of the resinous material at the gate 15 is completed and no back flow of the resinous material into the cavity 16 occurs or a point at which sealing of the gate 15 is completed.

Figure 3A:
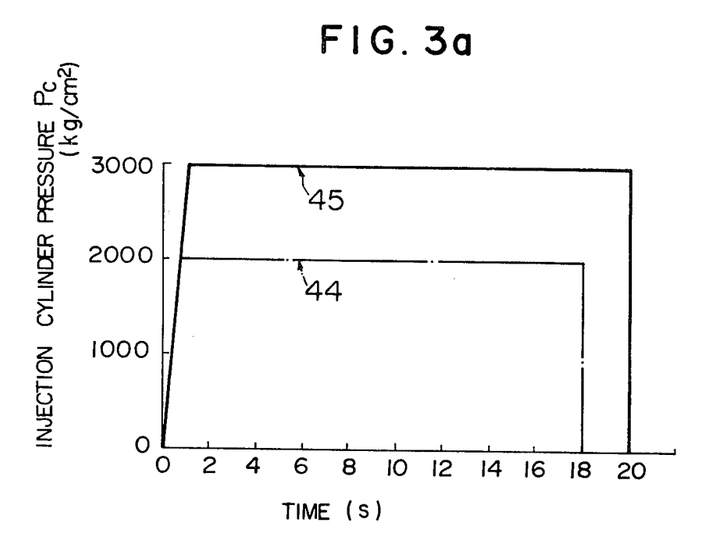
FIG. 3a is a diagrammatic representation of the relation between the injection cylinder pressure and the time obtained when injection molding of thermoplastic resinous material is carried out according to the invention under conditions distinct from the conditions shown in FIGS. 2a and 2b.
Figure 3B:
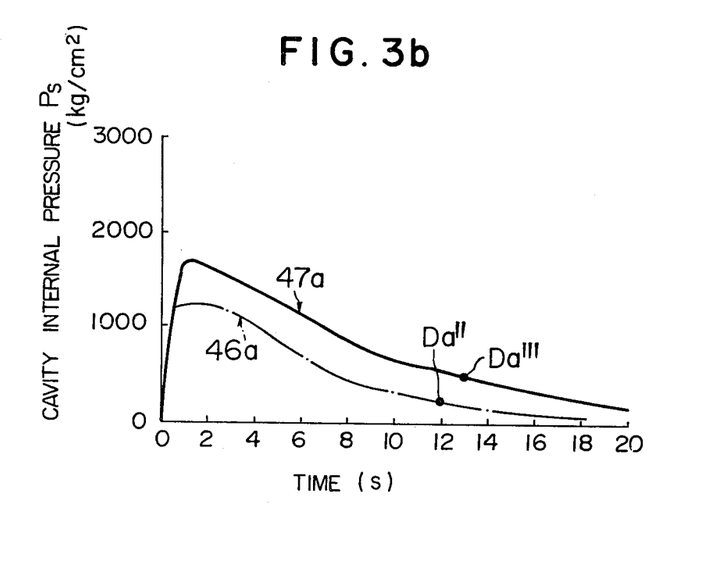

FIG. 3a shows the relation between the injection cylinder pressure (kg/cm$^2$) and the time (S) obtained when a cylinder part of the same shape as described by referring to FIGS. 2a and 2b was produced by injection molding of polyacetal resin, and FIG. 3b shows the relation between the cavity internal pressure (kg/cm$^2$) and the time (S) obtained when injection molding was carried out under the same conditions as described by referring to FIG. 3a. The conditions common to FIGS. 3a and 3b are that the four gates 15 each having a cross section of diameter of 0.5 mm are located at one end face of a cylinder part, that the temperature of the resinous material is 200° C. and that the temperature of the mold is 60° C. The abscissa in the diagrams of FIGS. 3a and 3b represents the time elapsing after initiation of injection. Lines 44 and 45 represent injection cylinder pressures applied by the hydraulic cylinder 7, and curves 46a and 47a indicates the characteristics of the cavity internal pressure obtained when the injection cylinder pressures represented by 44 and 45 respectively are applied (injection pressure and holding pressure being 2000 kg/cm$^2$, 3000 kg/cm$^2$). Points Da" and Da''' represent points in time at which sealing of the gates is completed.

The time elapsing from the pressure holding initiation time at which the injection pressure is switched to the holding pressure until the time at which sealing of the gates is completed may vary greatly depending on the type of resinous material, the molding conditions (injection pressure, holding pressure, mold temperature, resin temperature and the like), and the gate configuration. It is difficult to determine the gate sealing points Da, Db, Dc, Da', Da" and Da''' from the characteristics of the cavity internal pressures measured by the pressure sensor 18.

When the injection pressure rises to a high level as shown in FIG. 3a, the pressure sensing pin 17 would produce sliding resistance because the resin is forced into the gap between the mold and the pin so that what is called "flash" is formed in the gap. As a result, the internal pressure of the cavity 16 sensed by the pressure sensor 18 would have a value representing the sliding resistance of the pin 17 without returning to zero.

Thus in the invention, the holding pressure applied to the cavity 16 is removed when the pressure sensor 18 senses zero or a value close to zero in the cavity internal pressure characteristic.

Figure 5:
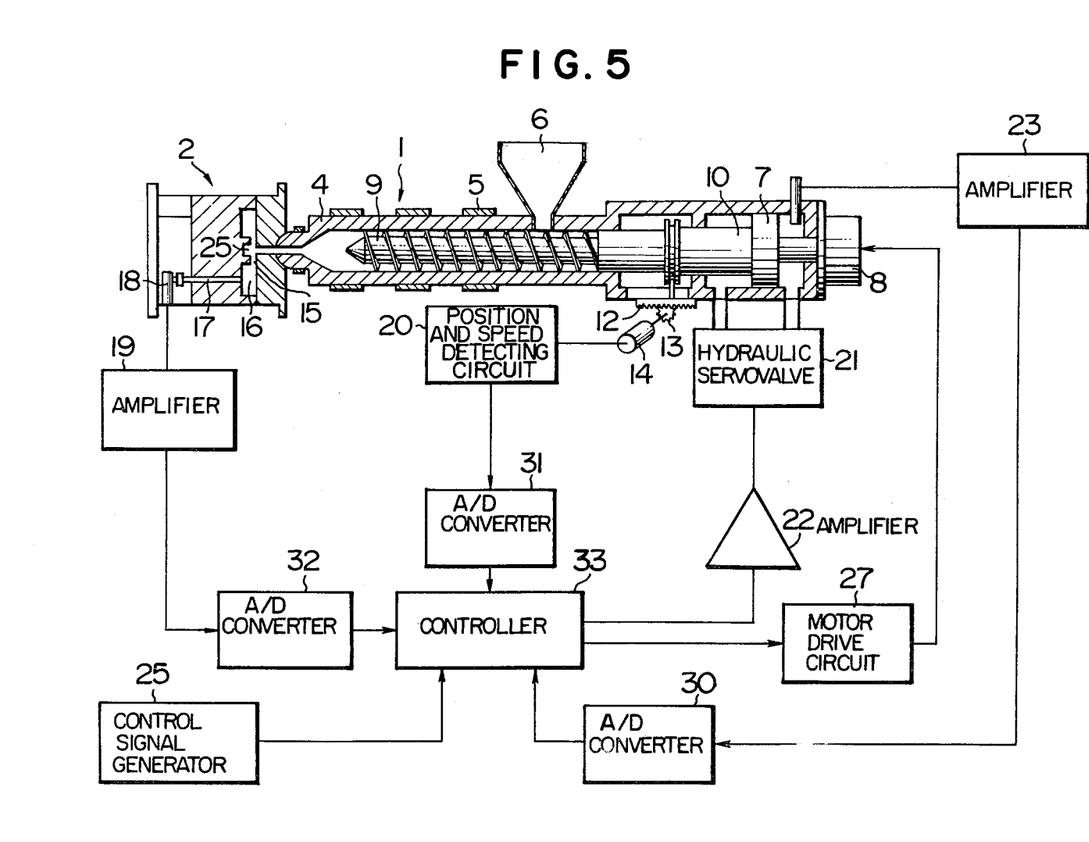
FIG. 5 is a view showing an apparatus suitable for carrying into practice the injection molding method according to the invention.

FIG. 5 shows an embodiment of the apparatus incorporating the invention in which parts similar to those shown in FIG. 1 are designated by like reference characters. As shown, a controller 33 comprising a microcomputer is connected to A/D converters 30, 31 and 32. The apparatus shown in FIG. 5 is distinct from that shown in FIG. 1 in that the timer 24 is done without, and in that the controller 33 is operative in response to a digital signal into which the signal from the pressure sensor 18 amplified by the amplifier 19 is converted by the A/D converter 32, to control the servovalve 21 and the servoamplifier 22 in place of the timer 24 in such a manner that when the cavity internal pressure Pc reaches a predetermined injection pressure Vp, the hydraulic servovalve 21 is actuated through the servoamplifier 22 to switch an injection pressure to a holding pressure to initiate pressure holding of the cavity 16, and that when the cavity internal pressure reaches a predetermined value Vo of zero or a value close to zero, the hydraulic servovalve 21 is actuated again through the servoamplifier 22, to release the cavity 16 from the aforesaid condition. More specifically, the controller 33 produces a holding pressure removing signal when the output of the A/D converter 32 becomes zero or a predetermined threshold value close to zero and the digit '1' changes into the digit '0'. Usually the gate sealing point is not clearly determined as shown in FIGS. 2a, 2b, 3a and 3b, so that it is advantageous to sense the point at which the cavity internal pressure reaches zero or a value close to zero for removing the holding pressure.

Figure 6:
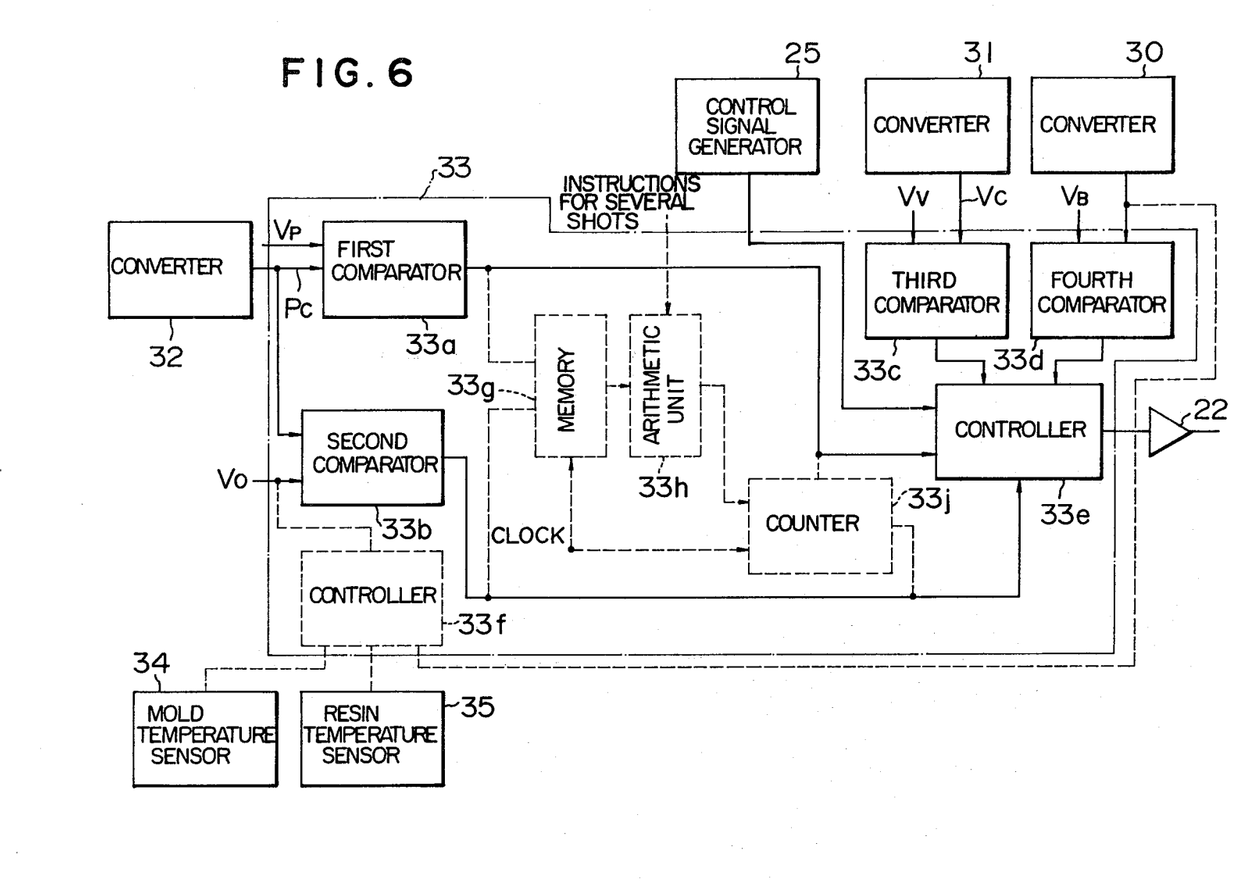
FIG. 6 is a view showing in concrete form the controller shown in FIG. 5.

FIG. 6 shows the construction of the controller 33 in concrete form in a block diagram. A first comparator 33a is operative to compare the cavity internal pressure Pc sensed by the pressure sensor 18 with the predetermined injection pressure Vp. A second comparator 33b is operative to compare the cavity internal pressure Pc sensed by the pressure sensor 18 with the predetermined value Vo set at zero or a value close to zero. A third comparator 33c is operative to compare the injection velocity V detected by the detector 14 with a predetermined injection velocity Vv. A fourth comparator 33d is operative to compare the injection cylinder pressure sensed by the hydraulic pressure sensor 11 with a predetermined holding pressure $V_B$. Control means 33e is operative to allow injection molding to be initiated when the sequence signal generator 25 generates a sequence control signal, to actuate the injection cylinder 4 at a predetermined velocity based on a deviation signal produced by the second comparator 33b, to switch the injection pressure to a holding pressure produced by the fourth comparator 33d when the signal produced by the first comparator 33a is sensed, and to remove the holding pressure when the signal produced by the second comparator 33b is sensed. Control means 33f is operative to control the value Vo depending on the temperature of the mold 2 sensed by a mold temperature sensor 34, the temperature of the resin sensed by a resin temperature sensor 35 and the holding pressure sensed by the hydraulic pressure sensor 11. A memory 33g is operative to determine and store the time that elapses after the first comparator 33a produces a pressure holding initiation signal until the second comparator 33b produces a pressure holding termination signal by counting clock pulses. An arithmetic unit 33h is operative to read the pressure holding time obtained from the memory 33g and calculate the mean time value for several shots as well as the standard deviation $\sigma$, so as to set the time of (mean time + $3\sigma$). A counter 33j is operative to calculate the clock pulses after the first comparator 33a produces the pressure holding initiation signal following lapse of several shots and produce a holding pressure removing signal following lapse of the time (mean time + $3\sigma$).

The mold temperature sensor 34 is coupled to the mold 2 of the injection molding apparatus to sense the temperature of the mold 2 and keeps the temperature of the mold 2 at a predetermined set value by controlling a heater, not shown, in the mold 2 through control means, not shown.

The resin temperature sensor 35 is mounted in a nozzle portion at the forward end of the injection cylinder 4 of the injection molding apparatus, to sense the temperature of the resinous material and control the heater 5 through control means, not shown, so as to keep the temperature of the resinous material at a predetermined set value. The hydraulic pressure sensor 11 senses the holding pressure applied to the cavity 16.

As shown in FIGS. 2b and 3b, the gate sealing points Da, Db, Dc, Da', Da" and Da''' are correlated to the temperature of the mold, the temperature of the resinous material and the holding pressure. Therefore, by feedbacking the outputs of the mold temperature sensor 34, resin temperature sensor 35 and hydraulic pressure sensor 11 to vary the threshold value, it is possible to bring the holding pressure removing point close to the gate sealing point. For example, when the holding pressure sensed by the hydraulic pressure sensor 11 is high, the threshold value may be raised; when the holding pressure is low, the threshold value may be lowered. Stated differently, the threshold value may be varied in conjunction with changes in the holding pressure to bring the holding pressure removing point close to the gate sealing point.

When molding of plastics is carried out under the same molding conditions, no particular variations are observed in the cavity internal pressure characteristic. Thus the time that elapses after pressure holding is initiated following initiation of molding until the cavity internal pressure becomes zero or a value close to zero may be stored in the memory 33g of the controller 33 for each of several shots, and the mean value of the times and the standard deviation $\sigma$ may be obtained, so as to control the hydraulic servovalve 21 based on the value of (mean time + $3\sigma$) to obtain the optimum pressure holding time.

The foregoing description of various embodiments refers to the molding of thermoplastic resinous material. It is to be understood, however, that the invention can have application in the injection molding and transfer molding of thermosetting resinous material with the same effects. In transfer molding, the injection pressure will naturally be transfer pressure.

Figure 4A:
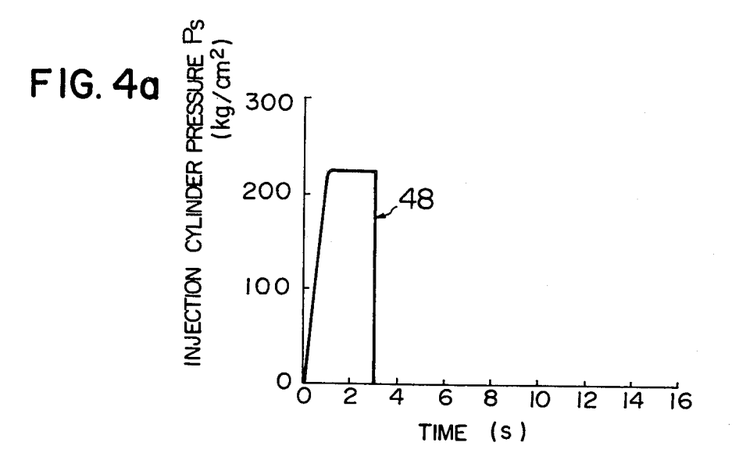
FIG. 4a is a diagrammatic representation of the relation between the injection cylinder pressure and the time obtained when injection or transfer molding of thermosetting resinous material is carried out according to the invention.
Figure 4B:
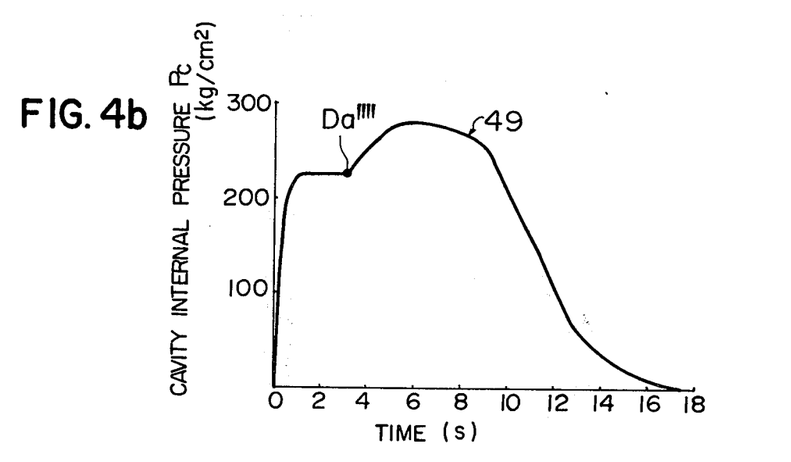

FIGS. 4a and 4b show characteristics obtained in molding unsaturated polyester resin. FIG. 4a shows the relation between the injection cylinder pressure (kg/cm²) and the time (S), and FIG. 4b shows the relation between the cavity internal pressure (kg/cm²) and the time (S). The molding conditions are as follows: a single gate is used with a cross-section of 1.5×1 mm, molded articles have a thickness of 4 mm and the mold has a temperature of 150° C.

It will be seen that the cavity internal pressure characteristic of the thermosetting resin as represented by a curve 49 is distinct from that of the thermoplastic resin shown in FIGS. 2b and 3b. That is, as shown in FIG. 4b, after the gate sealing point Da'''' is reached, the cavity internal pressure shows a slight increase due to thermal expansion of the resin and gradually drops as the resin cures. Thus, by removing the holding pressure at the inflection point Da'''' detected by converting the cavity internal pressure sensed by the sensor 18 into a digital signal by the A/D converter 32 and differentiating same, it is possible to avoid application of unnecessary holding pressure to the cavity 16.

Figure 4C:
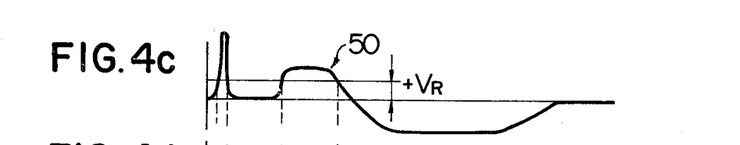
FIG. 4c is a view showing the signal wave form obtained by differentiating cavity internal pressure signal generated when molding is carried out as shown in FIG. 4b.
Figure 4D:
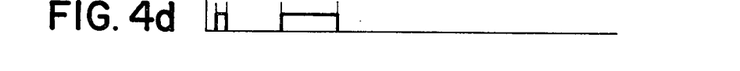
FIG. 4d is a view showing the signal wave form obtained by representing by binary digits the signal shown in FIG. 4c by using a predetermined threshold value.

As can be seen in FIGS. 4b and 2b, the gate sealing points Da'''' and Da' are disposed at the second and third inflection points of the curves 49 and 43a shown therein respectively. Thus it is possible to obtain a signal 50 shown in FIG. 4c by differentiating the signal produced by the pressure sensor 18, either directly or after the signal is converted into a digital signal. By reducing the signal 50 to a predetermined threshold value $+V_R$, it is possible to obtain a binary signal shown in FIG. 4d. One has only to remove the holding pressure from the cavity at the second rise of the binary signal.

In this case, the program for the controller 33 should be revised because these techniques lack generality.

It will be apparent that the need to effect control each time a plastic is molded can be eliminated in this case too. One has only to differentiate the signals obtained from the pressure sensor 18 for several shots and store the second or third inflection point in the memory 33g, to obtain the mean value and the standard deviation thereof so as to set the holding pressure removing time at a value which is the mean value plus $3\sigma$.

From the foregoing description, it will be appreciated that the invention enables the holding pressure removing time or the pressure holding time for different resins, different molding conditions and different gate configuration to be automatically set at an optimum value from the point of view of molding techniques, thereby enabling a reduction in the setup time, a decrease in the number of articles produced by trial molding and an elimination of unnecessary pressure holding loads to be realized. This is conductive to conservation of energy and natural resources and prolongation of the service life of the molding apparatus, and allows molded articles of high precision finishes free from shrinkage and a reduction in dimensions to be produced.

What we claim is:

1. Apparatus for molding a plastic, comprising:
an injection mold having a mold cavity;
a pressure sensor for sensing the pressure of plastic injected into the mold cavity to generate a cavity internal pressure signal;
inflection point detecting means for differentiating the cavity internal pressure signal from said pressure sensor by means of a differentiation circuit, to detect an inflection point corresponding to a gate sealing point of plactic with the mold cavity, and to generate an inflection point signal when said inflection point corresponding to a gate sealing point is detected;
zero sensing means for sensing that the cavity internal pressure signal from said pressure sensor becomes one of zero and a predetermined value close to zero to generate a zero signal; and
holding pressure removing means for removing a holding pressure which is exerted on plastic in the mold cavity, said holding pressure being removed in response to the zero signal from said zero sensing means when the inflection point corresponding to the gate sealing point is not detected by said inflection point detecting means, and for removing the holding pressure in response to the inflection point signal from said inflection point detecting means when the inflection point corresponding to the gate sealing point is detected by said inflection point detecting means.

2. An apparatus according to claim 1, including means for setting said predetermined value close to zero in accordance with the levels of the holding pressure, the mold temperature and the plastic temperature.

3. Apparatus for molding a plastic, comprising:
an injection mold having a mold cavity;
a pressure sensor for sensing the pressure of plastic injected into the mold cavity to generate a cavity internal pressure signal;
inflection point detecting means for differentiating the cavity internal pressure signal from said pressure sensor by means of a differentiation circuit, to detect an inflection point corresponding to a gate sealing point of the plastic in the mold cavity; and
means for removing a holding pressure which is exerted on plastic in the mold cavity, said holding pressure being removed when the inflection point corresponding to the gate sealing point is detected by said inflection point detecting means.

4. Apparatus for molding a plastic, comprising:
an injection mold having a mold cavity;
a pressure sensor for sensing the pressure of plastic injected into the mold cavity to generate a cavity internal pressure signal;
inflection point detecting means for differentiating the cavity internal pressure signal from said inflection point detecting means by a differentiation circuit, to detect an inflection point corresponding to a gate sealing point of plastic within the mold cavity, and to generate an inflection point signal when said inflection point corresponding to a gate sealing point is detected;
a memory for memorizing for a first plurality of molding shots time durations from a time of the initiation of a holding pressure exerted on plastic with the mold cavity to a time when the inflection point corresponding to a gate sealing point is detected by said inflection point detecting means for each molding shot within said first plurality of molding shots;
arithmetic means for calculating a mean value (T) and a deviation ($\sigma$) of the time durations memorized by said memory, to obtain (T+3$\sigma$); and
holding pressure removing means for removing the holding pressure when the time of (T+3$\sigma$) obtained by said arithmetic means alapses from the initiation of the holding pressure in molding shots following said first plurality of molding shots.

5. An apparatus according to claim 3, 1 or 4, wherein said holding pressure is exerted by an injection cylinder coupled to said mold cavity.

6. An apparatus according to claim 3, 1 or 4, wherein the holding pressure is exerted by a transfer device coupled to said mold cavity.

7. An apparatus according to claim 3, 1 or 4, wherein said plastic material being molded is a thermosetting material having a characteristic wherein said inflection point in said cavity internal pressure signal which corresponds to a gate sealing point occurs prior to an increase in said cavity internal pressure caused by thermal expansion of said thermosetting resin during curing.

8. An apparatus according to claim 7, wherein said inflection point in said cavity internal pressure signal which corresponds to a gate sealing point is the second inflection point in said cavity internal pressure signal following the application of pressure to said mold cavity.

9. An apparatus according to claim 3, 1 or 4, wherein said plastic is a thermoplastic material.

10. An apparatus according to claim 9, wherein said inflection point in said cavity internal pressure signal which corresponds to a gate sealing point is the third inflection point in said cavity internal pressure signal following the application of pressure to said mold cavity.

* * * * *